UNITED STATES PATENT OFFICE 2,505,496

PRODUCTION OF CYANINE DYESTUFFS

John David Kendall and Frank Peter Doyle, Ilford, England, assignors to Ilford Limited, Ilford, England, a British company No Drawing. Application July 1, 1946, Serial No. 680,825. In Great Britain July 3, 1945

7 Claims. (Cl. 260—240)

This invention relates to the production of cyanine and merocyanine dyestuffs and to the sensitisation of photographic silver halide emulsions therewith.

In co-pending application No. 680,824 filed on even date herewith, now U. S. Patent 2,465,883, granted March 29, 1949, processes are described for the production of dyestuff intermediates of the formula

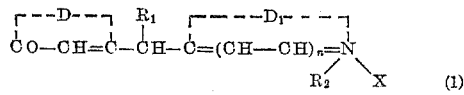

which is tautomeric with

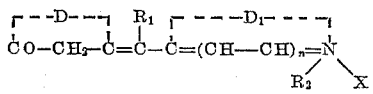

where $R_1$ is a hydrogen atom or a hydrocarbon group, $R_2$ is an alkyl or aralkyl group, D is a chain of three methylene groups any of which may be hydrocarbon-substituted, $D_1$ is a residue of a five-membered or six-membered heterocyclic nitrogen nucleus, X is an acid radicle and $n$ is nought or one.

According to the present invention a dyestuff intermediate of the type indicated in Formula 1 in which $D_1$ is the residue of a heterocyclic nitrogen ring selected from the class consisting of thiazole, selenazole and their polycyclic homologues, thiazoline, selenazoline, diazines and diazoles is reacted with a compound of the formula shown in formula:

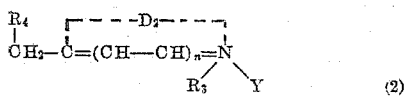

where $D_2$ is a residue selected from the class consisting of residues of thiazole, selenazole and their polycyclic homologues such as those of the benzene, naphthalene, acenaphthene and anthracene series, pyridine and its polycyclic homologues such as quinoline and α and β-naphthoquinolines, lepidines, diazines such as pyrimidines and quinazolines, diazoles (e. g. thio ββ'-diazole), thiazolines and selenazolines, $R_3$ is an alkyl or aralkyl group, $R_4$ is a hydrogen atom or a hydrocarbon group, Y is an acid radicle and $n$ is nought or one, or with a corresponding compound in which the —$CH_2R_4$ grouping is replaced by an $NHR_4$ grouping, the reaction being effected in the presence of a base.

The polycyclic homologues referred to above may also be substituted in the carbocyclic rings with one or more groups such as alkyl, aryl, amino, hydroxy, alkoxy and methylene-dioxy groups or by halogen atoms.

The formation of the dyestuffs is readily effected by heating the reagents together in the presence of a solvent and a strong base, e. g. triethylamine or an inorganic base such as a solution of sodium or sodium acetate in ethyl alcohol.

Where the dyestuff is obtained in the form of a sulphate or an alkyl-p-toluene sulphonate, it may be converted to a salt of another acid by treatment with a solution of an alkali salt of such other acid, e. g. potassium chloride, potassium bromide, potassium iodide and potassium perchlorate.

The following examples will serve to illustrate the invention, but are not to be regarded as limiting it in any way. The parts are by weight.

Example 1

7 parts of Δ2:3-(3-ethylthio-5:5'dimethyl) cyclohexenone (1), 3.7 parts of 1-methyl benzthiazole and 4.7 parts of methyl-p-toluene sulphonate were fused for 2 hours at 100° C. 150 parts of acetic anhydride were added and the mixture refluxed for 1 hour. The excess acetic anhydride was removed in vacuo and the residue washed with ether three times.

3.6 parts of lepidine and 4.7 parts of methyl-p-toluene sulphonate were fused at 120° C. for 2 hours and the cooled mass then dissolved in 100 parts of pyridine and added to the first fusion product. The mixture was refluxed to dissolve the quaternary salts and 5 parts of triethylamine was then added. After refluxing for 2 hours the green-blue solution was poured into aqueous potassium iodide solution, cooled and diluted. The precipitated dyestuff was filtered off and washed with water, ethyl alcohol, benzene and ether. After boiling out from methyl alcohol it remained as green crystals, M. P. 239° C. (with decomposition). The dyestuff had the formula:

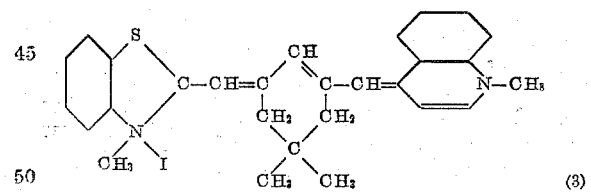

Example 2

5.8 parts of 5.5 dimethyl-3(α-methenyl benzthiazole methiodide) cyclohexanone (1), 7.5 parts of quinaldine methiodide, and 100 parts of pyridine were refluxed together and 6.5 parts of triethylamine was added. After refluxing for 1 hour the green-blue solution was poured into aqueous potassium iodide solution, from which the dyestuff crystallised after cooling and diluting. It was removed by filtration and washed with water, ethyl alcohol, benzene and ether, and then crystallised from methyl alcohol, from which it was obtained as green crystals, M. P. 247° C. (with decomposition). This dyestuff had the formula:

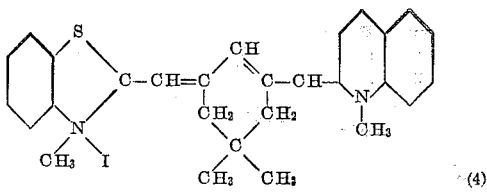

Example 3

1.96 parts of 1-methyl benzselenazole and 1.86 parts of methyl-p-toluene sulphonate were fused at 100° for 2 hours. 4.9 parts of 5.5-dimethyl-3(α-methenyl benzthiazole methyl-p-toluene sulphonate) cyclohexanone (1), and 100 parts of pyridine were added and the whole boiled for ½ hour. 11 parts of triethylamine was added, and after boiling for a further half an hour the green solution was poured into aqueous potassium iodide solution and cooled, when the dyestuff crystallised out. After isolation and purification as in Example 1 the dyestuff was obtained as bright green crystals, M. P. 267° C. (with decomposition). This dyestuff had the formula:

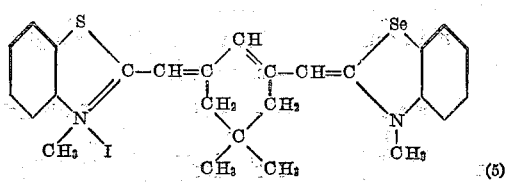

Example 4

4.3 parts of 3(α-methenyl benzthiazole methyl-p-toluene sulphonate) cyclohexanone (1), 3.2 parts of 1:4-dimethyl benzthiazole ethiodide and 150 parts of alcohol were heated to dissolve the quaternary salts and 2 parts of triethylamine were added, the mixture boiled for 30 minutes and poured into dilute aqueous potassium iodide solution. The dyestuff was isolated as in Example 1 and recrystallised from ethyl alcohol when it was obtained as matted blue needles which sintered at 150° and decomposed above 200° C. The dyestuff had the formula:

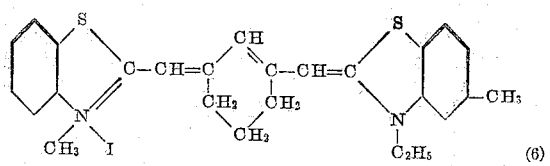

The dyestuffs produced by the processes of this invention are valuable sensitisers for silver halide photographic emulsions. Thus, for example, the dyestuff of Example 1, included in a gelatin silver iodobromide emulsion, sensitises with a maximum at 7900–8000 Å., the dyestuff of Example 2, similarly used, sensitised with a maximum at 7500 Å., the dyestuff of Example 3, similarly used, sensitised with a maximum at 7000 Å., and the dyestuff of Example 4, similarly used, sensitised with a maximum at 6900 Å.

Accordingly it is a further and important feature of this invention that improved silver halide photographic emulsions are provided which include, in sensitising amount, dyestuffs producible by the processes of this invention. These include compounds of the general formulae

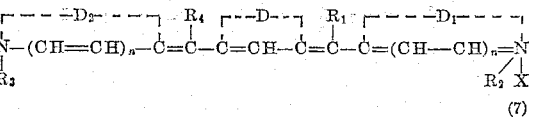

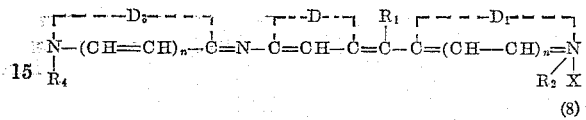

In these formulae the various symbols have the meanings assigned to them above.

What we claim is:

1. A process for the production of dyestuffs which comprises reacting together (a) a dyestuff intermediate of the general formula:

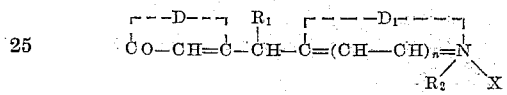

where $R_1$ is selected from the class consisting of the hydrogen atom and hydrocarbon groups, $R_2$ is selected from the class consisting of alkyl and aralkyl groups, X is an acid radicle, n is nought or one, $D_1$ is the residue of a heterocyclic nucleus selected from the class consisting of thiazole, selenazole and their polycyclic homologues of the benzene, naphthalene and anthracene series, thiazoline, selenazoline, diazines and diazoles, and D is a chain of three methylene groups any of which may be hydrocarbon-substituted and (b) a compound selected from the class consisting of compounds of the general formula:

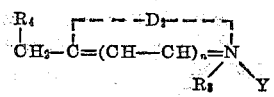

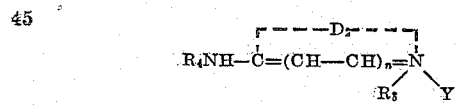

where $R_3$ is selected from the class consisting of alkyl and aralkyl groups, $R_4$ is selected from the class consisting of the hydrogen atom and hydrocarbon groups, Y is an acid radicle, n is selected from nought and one and $D_2$ is the residue of a heterocyclic nitrogen nucleus selected from thiazole, selenazole and their polycyclic homologues of the benzene, naphthalene and anthracene series, pyridine, quinoline, α-naphthoquinoline, β-naphthoquinoline, lepidines, diazines, diazoles, thiazolines and selenazolines, the reaction being effected by heating the reactants together in the presence of a base.

2. A process according to claim 1 wherein the groups X and Y are p-toluene sulphonate radicles.

3. A process according to claim 1 wherein the reaction is effected in the presence of a solvent for the reactants.

4. Dyestuffs of the general formula:

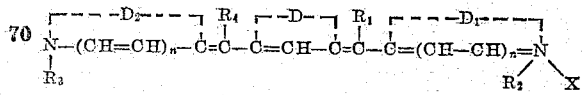

where $R_1$ is selected from the class consisting of the hydrogen atom and hyrocarbon groups, $R_2$ is selected from the class consisting of alkyl and aralkyl groups, X is an acid radicle, $n$ is nought or one, $D_1$ is the residue of a heterocyclic nucleus selected from the class consisting of thiazole, selenazole and their polycyclic homologues of the benzene, naphthalene and anthracene series, thiazoline, selenazoline, diazines and diazoles, $D_2$ is the residue of a heterocyclic nitrogen nucleus selected from thiazole, selenazole and their polycyclic homologues of the benzene, naphthalene and anthracene series, pyridine, quinoline, α-naphthoquinoline and β-naphthoquinoline, lepidines, diazines, diazoles, thiazolines and selenazolines, D is a chain of three methylene groups any of which may be hydrocarbon-substituted, $R_3$ is selected from the class consisting of alkyl and aralkyl groups and $R_4$ is selected from the class consisting of the hydrogen atom and hydrocarbon groups.

5. The dyestuff of the formula:

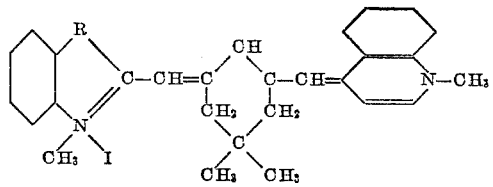

6. The dyestuff of the formula:

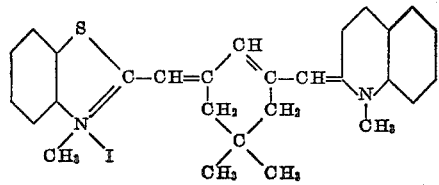

7. The dyestuff of the formula:

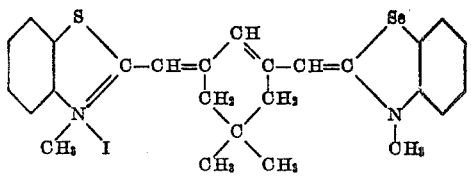

JOHN DAVID KENDALL.
FRANK PETER DOYLE.

REFERENCES CITED

The following references are of record in the file of this patent:

UNITED STATES PATENTS

| Number | Name | Date |
|---|---|---|
| 2,138,223 | Wilmanns | Nov. 29, 1938 |
| 2,166,736 | White et al. | July 18, 1939 |
| 2,263,749 | White et al. | Nov. 25, 1941 |
| 2,265,909 | Kendall | Dec. 9, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |

OTHER REFERENCES

Chemical Abstracts, 16:3101, (Abstract of Brit. Med. Journal 1922, I 514–515).

Chemical Abstracts, 19:530, (Abstracts of Proc. Royal Soc. London, 96B 317–333, 1924).

Certificate of Correction

Patent No. 2,505,496 April 25, 1950

JOHN DAVID KENDALL ET AL.

It is hereby certified that errors appear in the printed specification of the above numbered patent requiring correction as follows:

Column 3, lines 12 to 18, inclusive, for that portion of the formula reading

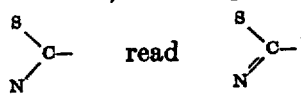

same lines, for

column 5, lines 21 to 23, inclusive, in the formula for

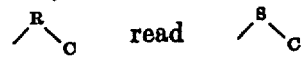

lines 22 to 24, inclusive, for

and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*